(12) United States Patent
Frank

(10) Patent No.: US 6,792,095 B1
(45) Date of Patent: Sep. 14, 2004

(54) AUTOMATIC FEATURE CHANGEOVER BETWEEN A WIRED TELEPHONE AND A WIRELESS PORTABLE TELEPHONE

(75) Inventor: Richard Frank, Coral Springs, FL (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 0 days.

(21) Appl. No.: 09/568,785

(22) Filed: May 10, 2000

(51) Int. Cl.[7] ............................................... H04M 3/42
(52) U.S. Cl. ................................... 379/216.01; 455/445
(58) Field of Search ...................... 379/216.01, 355.01; 455/445, 552

(56) References Cited

U.S. PATENT DOCUMENTS

| | | | |
|---|---|---|---|
| 4,839,918 A | | 6/1989 | Hata ........................... 455/462 |
| 5,197,092 A | * | 3/1993 | Bamburak ............. 379/211.05 |
| 5,454,032 A | | 9/1995 | Pinard et al. .......... 379/167.05 |
| 5,526,403 A | * | 6/1996 | Tam ............................ 455/426 |
| 5,699,407 A | * | 12/1997 | Nguyen ....................... 455/462 |
| 5,757,902 A | | 5/1998 | Mitsuo .................. 379/212.01 |
| 5,970,388 A | | 10/1999 | Will ............................ 340/7.29 |
| 6,049,719 A | | 4/2000 | Schroter ...................... 455/462 |
| 6,266,523 B1 | * | 7/2001 | Cook et al. .................. 455/403 |

FOREIGN PATENT DOCUMENTS

| | | |
|---|---|---|
| EP | 0 740 482 | 10/1996 |
| EP | 0 786 916 | 7/1997 |

* cited by examiner

*Primary Examiner*—Ahmad F. Matar
*Assistant Examiner*—Quynh H. Nguyen (57) ABSTRACT

A telecommunications system provides "feature forwarding" between a fixed telephone unit (such as a desktop wired telephone) and a portable telephone unit (such as a cellular telephone) that are assigned to the same prime telephone number. Thus, only one of the two phones in the telephone pair is accessible (e.g., is forwarded ring signals) at any one time. In one embodiment, the system monitors changes in state regarding whether or not the wireless telephone is in a power recharging state. When the wireless telephone is connected to a power recharger, the wired telephone is designated as the current exclusive telephone to which service features are to be applied. On the other hand, when the wireless telephone is removed from the power recharging state, the common user information necessary for seamlessly implementing common features is reallocated to providing service to the wireless telephone. The common features may include a last number redial feature, a saved number redial feature, and/or features related to accessing voice mail messages.

17 Claims, 4 Drawing Sheets

AUTOMATIC FEATURE CHANGEOVER BETWEEN A WIRED TELEPHONE AND A WIRELESS PORTABLE TELEPHONE

TECHNICAL FIELD

The invention relates generally to enabling a telephone user to use both a fixed telephone unit and a portable telephone unit and relates more particularly to providing automatic changeovers of service features for the operations of the two telephone units.

DESCRIPTION OF THE RELATED ART

In a typical corporate environment, at least some of the employees have assigned work areas that include dedicated telephones. Each dedicated telephone has access to an assigned prime (main) line and several associated lines. The prime line is accessed by a single telephone number. In addition to basic telephone service, the telephones may be enabled to provide extended service features. Telephones having extended features are sometimes referred to as "feature phones," and are more likely to be digital phones than analog phones.

A private branch exchange (PBX) or proprietary communications server will associate certain features with the prime line of each dedicated telephone. For example, a feature phone may have a Message Waiting indicator (such as a light) which provides a signal that a voice mail message has been stored for retrieval by the user of the telephone. As another example, voice mail messages may be stored in a voice mail box that is accessible only by using a particular telephone. That is, the voice mail boxes may be directly associated with the prime lines, so that there is a one-to-one correspondence between the feature phones and the voice mail boxes. The "last number redial" feature and the "saved number redial" feature are also often associated with a particular feature phone, so that a user who presses the saved number redial button on his or her phone will cause the number to be saved for that phone, but not any other phone.

The feature phones are typically desktop keysets that are substantially fixed in position. That is, the phones may have cordless handsets, but at least a base member is wired in position. In addition to the wired telephone, a corporate executive may be assigned a wireless portable telephone, such as a cellular phone. Conventionally, the portable telephone has its own prime line that is necessary to distinguish it from telephones of other users, has associated lines, and has features that attempt to duplicate the capabilities of the user's wired telephone. Based on the design of the portable telephone, these lines and features may not have dedicated physical buttons, but instead may be selectable via "soft" keys and associated display. The portable telephone, however, cannot duplicate the functionality of the desktop phone if the two phones have different prime lines. The separate prime lines require separate Message Waiting indicators and separate voice mail boxes. The user having dual phone capability will have two different main telephone numbers, one for the desktop phone and one for the portable phone. Features related to line use apply separately to each of the prime lines. For example, if the user forwards incoming calls to the prime line of the desktop phone, they will not be forwarded to the prime line of the portable phone. The reverse is also true. Moreover, features related to the particular telephone unit will not be interchangeable. For example, if a user changes from using the desktop phone to using the portable phone, activating the last number redial feature on the portable telephone will not select the last number dialed from the desktop phone.

There are known systems for providing cooperation between a fixed telephone unit and a portable member. While not directly related, U.S. Pat. No. 4,839,918 to Hata describes a system for enabling switching between a cordless telephone (that includes a fixed portion and a cordless portable portion) and an ordinary telephone that may be connected to the cordless telephone through a subscriber network. The switching arrangement of Hata allows continuous operation of the telephones, even during failure of the power supply that provides power to the fixed portion of the cordless telephone. The Hata patent is concerned with providing continued basic service to the two telephones of the user, rather than providing a continuation of service features.

U.S. Pat. No. 5,454,032 to Pinard et al. describes a method of establishing communication to one of multiple devices that are associated with a single telephone number. A home subscriber may have a home telephone, a cellular telephone, and a facsimile machine. The three devices may be assigned three different telephone numbers, or may be assigned a single telephone number that rings the various devices. In accordance with Pinard et al., when an incoming call is received via the telephone number that supports a number of devices, all of the devices ring. After one of the ringing devices is answered, thereby going off-hook, a communication link is established from the calling line only to the device that has gone off-hook. The remaining devices are blocked from use. Thus, the subscriber can be called using a single telephone number and can use whichever device is most convenient, e.g., the home telephone or the cellular telephone. This capability is achieved by storing tables at a central office telephone switching system or a PBX, so that the switching system or PBX can quickly determine which of the devices was used to respond to an incoming call. While the method allows a wired telephone and a wireless telephone to be accessible by means of a single telephone number, the service features such as last number dialed are not universally applied. Rather, the use of a service feature at one of the devices, such as the wired telephone, is independent of the use of the same service feature at another device, such as the wireless telephone.

Another system that allows a wired telephone and a wireless telephone to share a single telephone number is described in U.S. Pat. No. 5,757,902 to Mitsuo. A wire port physical number is registered in association with a radio port physical number, so that the wired and wireless telephones can be handled as if they were a single-channel extension phone with a branch switch. A call to the wired telephone can then be transferred to the wireless telephone by a simple operation. The patent notes that the secretary of a subscriber may trigger the transfer of an incoming telephone call from being directed to the wired telephone to being directed to the wireless telephone, if the subscriber is not near the wired telephone. In another embodiment, the two phones are called simultaneously, allowing the subscriber to answer either phone. Again, the concern relates to providing basic connectivity, rather than to providing extended features.

The prior art inventions allow a user to have a dual presence that appears to be a single presence to a calling party. What is needed is a method and system that enable a user to have an increased perception of a single presence, at least with respect to the application of extended service features.

SUMMARY OF THE INVENTION

A telecommunications system "relocates" user-specific service features between a fixed telephone unit and a portable telephone unit that are assigned the same prime (main) telephone number. In the preferred embodiment, the fixed telephone unit is a wired telephone and the portable telephone unit is a wireless telephone. The two telephones offer a number of service features, including user-specific features that are available via operations of either of the two telephones. These common user-specific features may include automatic redial features and voice mail accessibility features "Common user information" is defined herein as the information relevant to implementation of these common user-specific features. Based upon the current availability of the wireless telephone, either the wireless telephone or the wired telephone is selected.as the current exclusive telephone to which the common user information is to be applied. In effect, the method and system provide "feature forwarding."

The changeover operations are automatically implemented. That is, the user of the telephones is not required to key in any information, such as access codes. Rather, the preferred embodiment automatically monitors the current availability of the wireless telephone by detecting when the wireless telephone is inserted into or removed from a power recharger. Thus, when the wireless telephone is in a power recharging state, the wired telephone is selected as the exclusive telephone unit to which the common user information is applied. Removal of the wireless telephone from the battery recharging state is automatically detected and used to trigger the selection of the wireless telephone as the exclusive telephone unit. In one embodiment, the common user information is stored in memory at a telecommunications switch, such as a private branch exchange (PBX). A partial database that includes the common user information is reassociated each time that there is a changeover in the selection of the exclusive telephone unit. In another embodiment, the common user information is stored in memory at the selected current exclusive telephone unit. In this second embodiment, the partial database of common user information is transferred between the two telephones with each automatic changeover of the selected current exclusive telephone unit. This requires a "hot sync" operation with each changeover.

There are a number of different possible hardware configurations for providing the cooperation necessary to achieve the automatic changeover. As one alternative, the power recharger may be built into the wired telephone. The built-in recharger is adapted to receive the wireless telephone. As another alternative, the power recharger and the wired telephone are physically independent, but are linked by hardwiring that is used to monitor the presence of the wireless telephone within the recharger. As a third alternative, the recharger and the wired telephone are physically and electrically independent, but may be located in the same general area. In the first and second configurations, the recharger and the wired telephone cooperate to determine when the wireless telephone is in the power recharging state. When the wireless telephone is in the recharger, a contact is closed. The wired telephone monitors the state of the contact. When a change of state occurs, the wired telephone transmits a notification signal to the telecommunications switch, such as a PBX. In the third configuration, the wireless telephone monitors whether or not it is in the power recharging state. When a change of state occurs, the wireless telephone generates a notification signal via its radio channel to the radio base station currently serving that wireless phone. If the radio base station is the "home" location for the wireless phone, the change of state is acted upon by the PBX controller to execute the "feature forwarding." The "home" radio base station is the one that provides radio coverage to the area in which the wired phone is located. This additional check is necessary in order to permit the wireless phone user to be able to recharge the phone without enabling the wired phone, e.g., when the user is away from the area in which the wired phone is located.

In all three configurations, the PBX controller (or other central system control) performs the automatic relocation or reallocation of the common user information. The relocation or reallocation is from the memory associated with a previously designated current exclusive telephone unit to a presently designated current exclusive telephone unit. The PBX controller also marks the unused telephone as being out-of-service or otherwise unusable, so that control signals (e.g., ring signals) are only forwarded to the in-use telephone. The restriction on access to the marked out-of-service telephone has the following exceptions: (1) for the first and second configurations, the wired phone is monitored to detect when the wireless phone is placed in the power recharging state, even when the wired phone is out-of-service, and (2) in the third configuration, even when the wireless phone is out-of-service, it is continuously monitored to detect when the phone is removed from the power recharging state.

It is noted that the "common user information" does not include all of the information necessary for implementing extended service features. Rather, the common user information relates to those features that are common to both the fixed telephone unit and the portable telephone unit. Because a desktop digital telephone may have more button functions than can be handled by a conventional wireless phone, and because a wireless phone may have unique features or functions (e.g., a continuous record of radio base station connections), the database information of the two phones is not completely common.

An optional component of the system is a feature button which overrides the automatic changeover between the wired phone and the wireless phone. The new feature button may be toggled between an on-state and an off-state and may include an indicator (e.g., a light emitting diode) that is illuminated to indicate that the wired telephone is functional. The new feature button permits the user to activate/deactivate the wired telephone independently of whether or not the wireless telephone is in the recharger. One possible use of this feature button would be to activate the wired telephone when the user has misplaced the wireless telephone.

DETAILED DESCRIPTION

Figure 1:
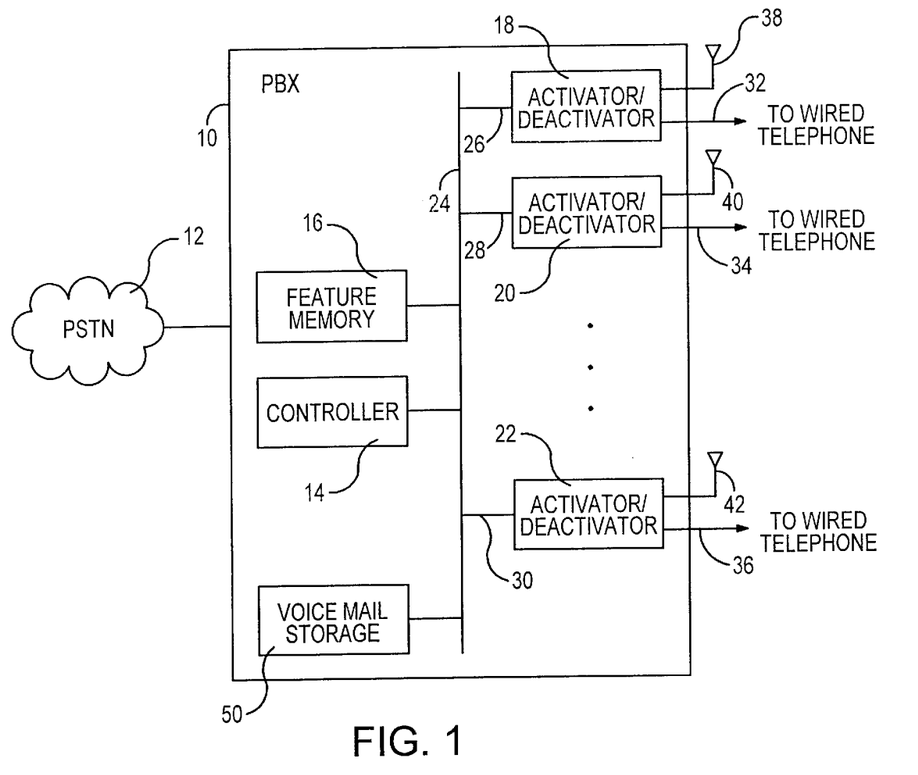
FIG. 1 is a block diagram of a PBX that enables switching of common user information in accordance with one embodiment of the invention.

With reference to FIG. 1, one possible configuration for implementing automatic changeover of common feature information is shown as including a PBX 10 connected to the public switched telephone network (PSTN) 12. The connection to the PSTN allows phones that are supported by the PBX to be connected to externally supported telephones. With the exception of the ability to provide automatic changeover between a fixed telephone unit, such as a desktop wired feature phone, and a portable telephone unit, such as a cellular phone, the PBX operates in the same manner as conventional telecommunication switches of this type. While the automatic changeover will be described primarily with respect to implementation by means of a PBX, this is not critical. The operations may be executed by means of a communications server that is privately owned or by equipment at a central office of the PSTN.

The PBX 10 is shown as including a controller 14 and feature memory 16. The controller is configured to provide all of the conventional functions and services of a PBX and to implement the automatic changeover in accordance with the invention.

At least some of the persons who receive telephone service via the PBX 10 may have both a fixed telephone unit and a portable telephone unit. The fixed telephone unit and the portable telephone unit are assigned one identity within the PBX controller 14. This single identity includes being associated with a single prime telephone number, i.e., a single prime line. Therefore, only one of the two telephone units can be used at one time. In the exemplary embodiment of FIG. 1, activator/deactivators 18, 20 and 22 are controlled to determine which of the two phone units is selected as the current exclusive telephone unit. Each activator/deactivator is connected to a bus system 24 of the PBX 10 by the prime line 26, 28 and 30 that is assigned to the activator/deactivator. The PBX controller 14 and the feature memory 16 are also connected to the bus system.

Each activator/deactivator 18, 20 and 22 is connected to a medium for communication with the fixed telephone unit and a medium for communication with the portable telephone unit. The first medium may be a digital connection 32, 34 and 36 to a wired digital feature phone. The second medium may be an antenna 38, 40 and 42 arrangement to a cellular telephone. Thus, each of the activator/deactivators that can be dedicated to a single user is assigned to a particular wired telephone and a particular wireless telephone.

When the wireless telephone of one of the users is placed in its power recharger, all of the functions/features of the wireless telephone are deactivated. Simultaneously, the functions/features of the wired telephone of the same user are activated. Subsequently, when the wireless telephone is removed from the power recharger, the functions/features of the wireless telephone are activated, while those of the wired telephone are deactivated. The invention will be described in the preferred embodiment in which activation and deactivation occur in response to placement of the wireless telephone within its power recharger. However, other embodiments are contemplated. Nevertheless, the activation/deactivation is typically not performed while one of the telephones is ringing or is otherwise in use. While in-use switching is technically possible, it is more complex.

Figure 2:
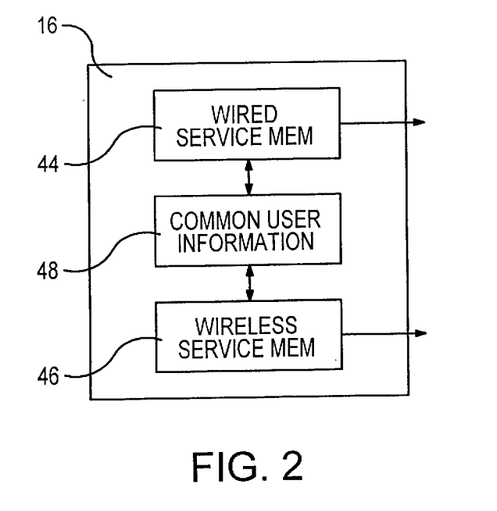
FIG. 2 is a block diagram of components of feature memory of the PBX of FIG. 1.

Referring now to FIGS. 1 and 2, the feature memory 16 may include three components. However, the format of the memory is not critical. Each component is a partial database. In the implementation of FIG. 2, the three components 44, 46 and 48 may be dedicated to a single user having access to both a wired telephone and a wireless telephone that share a single prime telephone number. One component is memory 44 for the wired service. Thus, if the wired telephone provides a conferencing service that is not provided by the wireless telephone, any user-specific information that may be used in providing this function will be stored in memory component 44. Similarly, memory component 46 is used to store user-specific information relating to functions and features that are offered by the wireless telephone, but not by the wired telephone. As an example, the wireless service memory 46 may be used to store a continuous record of radio base station connections for serving the wireless telephone.

The third component is the store for the common user information 48. The common user information may be stored in a database format. It is access to this partial database that is significant in the activation and deactivation of the wired telephone and the wireless telephone. Common user information may include that information relating to redial features and voice mail accessibility features. For example, both telephones may have a Message Waiting indicator (such as a light) which provides a signal when a voice mail message has been stored for retrieval. In FIG. 1, the PBX 10 includes an integrated voice mail storage component 50. However, an adjunct server may be substituted for the integrated storage component 50. There is a one-to-one correspondence between the prime lines 26, 28 and 30 and voice mail boxes within the voice mail storage 50. The automatic feature changeover that includes reassociating the common user information provides compatibility between accessing the voice mail box via the wired telephone and accessing the voice mail box via the wireless telephone of the same user.

The automatic changeover may also be used to provide compatibility between the use of the last number redial feature or the saved number redial feature by a telephone pair of a user (i.e., the wireless telephone and the wired telephone assigned to the user). Therefore, if a user places an outgoing call from one telephone of the telephone pair, the other telephone can be used to implement the last number redial feature after the automatic changeover has occurred. Similarly, if the user saves a telephone number from one of the telephones of the telephone pair, the saved number will be accessible via the other telephone in the pair.

Figure 3:
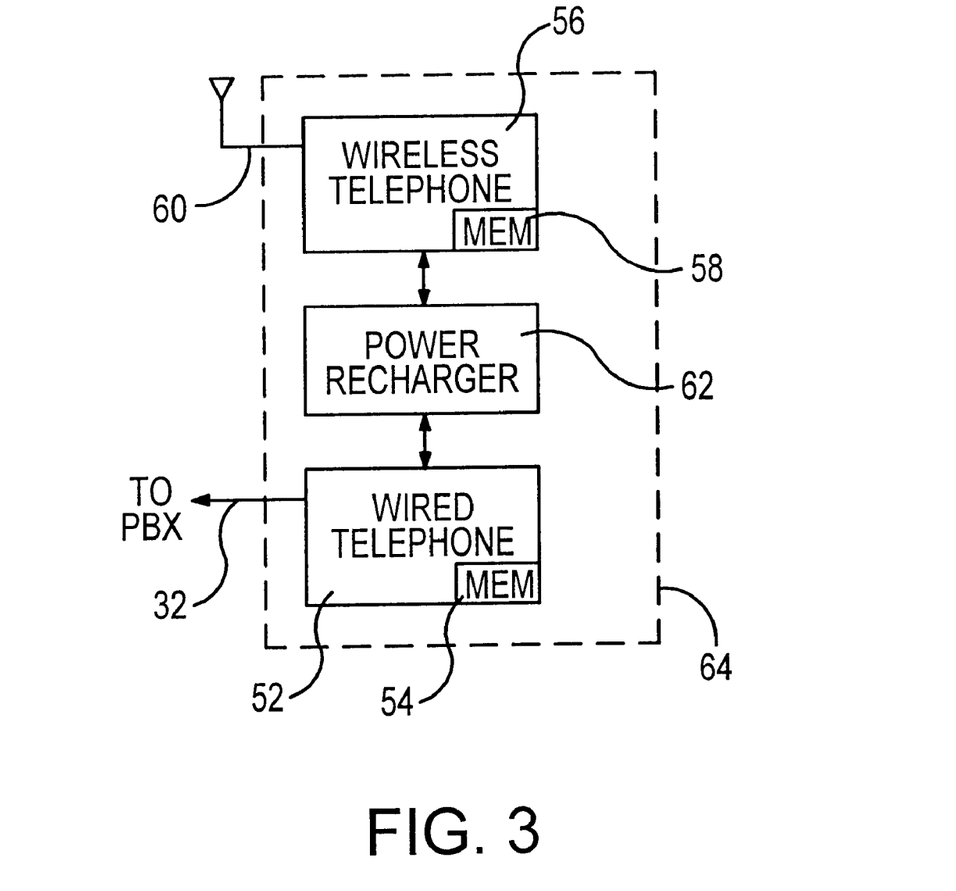
FIG. 3 is a block diagram of the telephones of a user of the system of FIG. 1.

The embodiment of FIGS. 1 and 2 executes all of the steps of the automatic feature changeover at the PBX level. However, this is not critical. For example, the individual telephones in the telephone pair may be used to store the feature information. Referring now to FIG. 3, a wired telephone 52 is shown as being connected to the digital line 32 to the PBX. The wired telephone includes internal memory 54 that stores data indicative of the last dialed number and the saved numbers. A wireless telephone 56 of the same user includes internal memory 58 for storing the same type of data. The wireless telephone communicates with the PBX via an antenna system 60. In an example of possible circumstances, the wireless telephone 56 is used to place an outgoing call and the telephone number is stored in the internal memory 58 of the wireless telephone. When the wireless telephone is seated in a power recharger 62, the automatic feature changeover changes the designation of the current exclusive telephone from the wireless telephone 56 to the wired telephone 52. As one alternative, there may be an exchange of the common user information (e.g., the last dialed number) directly from the wireless telephone 56 to the wired telephone 52. As a second alternative, the common user information may be directed through the PBX using the antenna 60 from the wireless telephone and the digital line 32 to the wired telephone.

The dashed lines 64 surrounding the wired telephone 52, the wireless telephone 56, and the battery recharger 62 are intended to designate these three components as being assigned to a single user. There are a number of different possible hardware configurations for providing the cooperation necessary to implement the automatic feature changeover. As one alternative, the battery recharger 62 is built into the wired telephone 52. This is the configuration illustrated in FIG. 4. The telephone 52 includes a conventional keypad 66, a liquid crystal display (LCD) readout 68, a Message Waiting indicator 70, a last number redial button 72, and a saved number redial button 74. Typically, a feature phone is able to save a collection of numbers that are of particular interest to the operator of the telephone pair. The operator may configure the telephone 52 to dial different saved numbers depending upon which key of the keypad 66 is depressed after the saved number redial button 74 is depressed. However, other configurations may be used.

Figure 4:
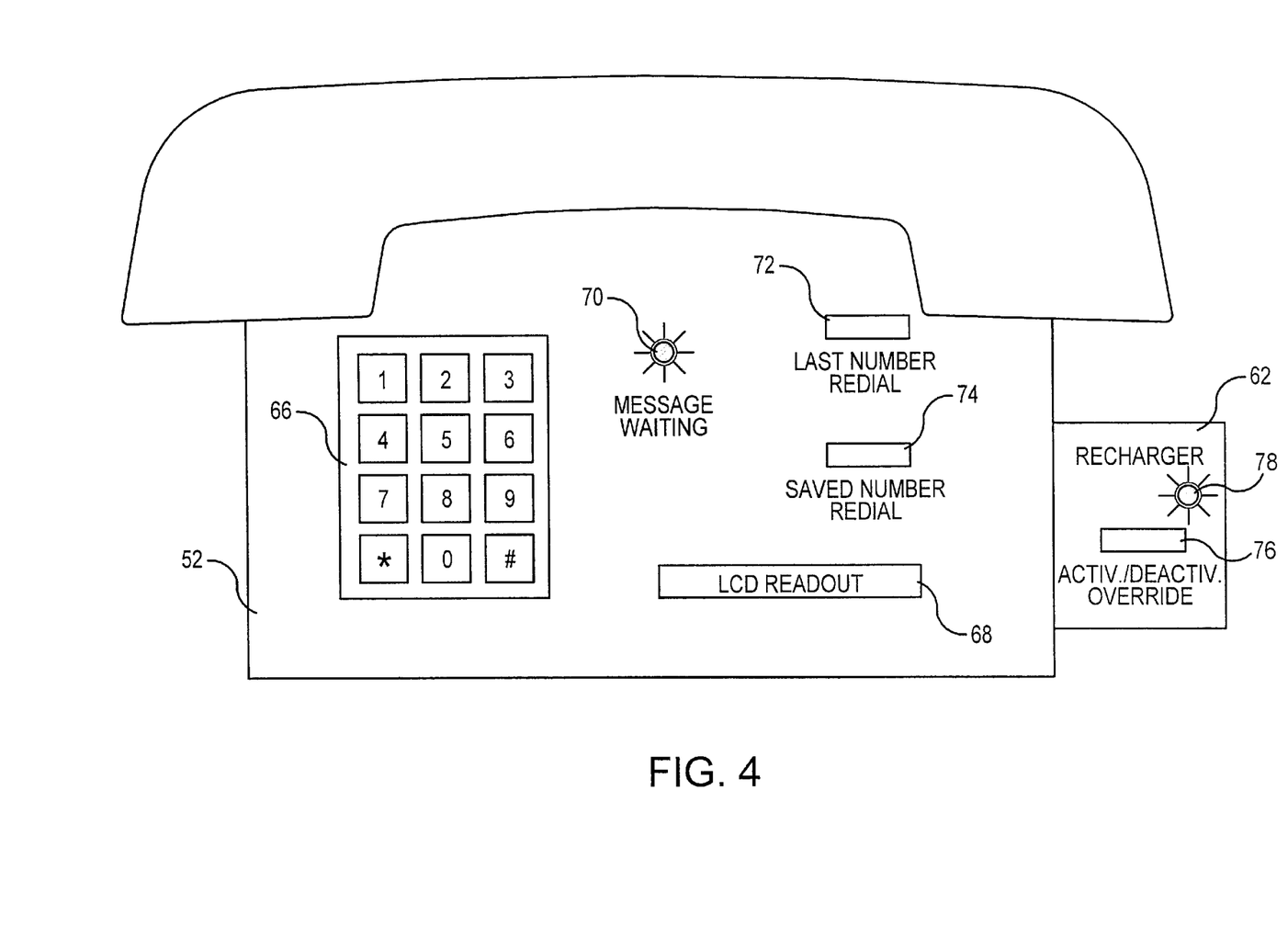
FIG. 4 is a simplified view of a wired telephone that may be used in the system of FIG. 1.

The power recharger 62 is connected directly to the wired telephone 52. The recharger optionally includes an activator/deactivator override button 76 and an override indicator 78. This allows the operator to selectively defeat the automatic feature changeover or to trigger a changeover independently of whether the wireless telephone is in the recharger. A possible use of this capability would be to activate the wired telephone 52 if the wireless telephone has been misplaced.

Returning to FIG. 3, a second alternative hardware configuration is to provide a power recharger 62 that is physically independent of the wired telephone 52. However, the two components may be hardwired to enable the wired telephone 52 to monitor the presence or absence of the wireless telephone 56 within the recharger. As a third alternative, the power recharger and the wired telephone are physically and electrically independent, but are located in the same general area.

In the first and second configurations, the battery recharger 62 and the wired telephone 52 cooperate to determine when the wireless telephone 56 is in the power recharging state. When the wireless telephone is in the recharger, a contact is closed. The wired telephone monitors the state of the contact. When a change of state occurs as a result of inserting or removing the wireless telephone from the recharger, the wired telephone transmits a notification signal to the PBX 10 of FIG. 1 via the digital line 32. In the third configuration, the wireless telephone monitors whether or not it is in the power recharging state. When a change of state occurs as a result of insertion into or removal from the recharger, the wireless telephone generates a notification signal via its radio channel to the radio base station currently serving the wireless phone. If the radio base station is the "home" location of the wireless phone, the change of state is acted upon by the PBX controller 14 to execute the "feature forwarding." The "home" radio base station is the one that provides radio coverage to the area in which the wired phone 52 is located. This additional check is necessary in order to permit the operator of the wireless phone to be able to recharge the phone without enabling the wired telephone, e.g., when the user is away from the area in which the wired phone is located.

Figure 5:
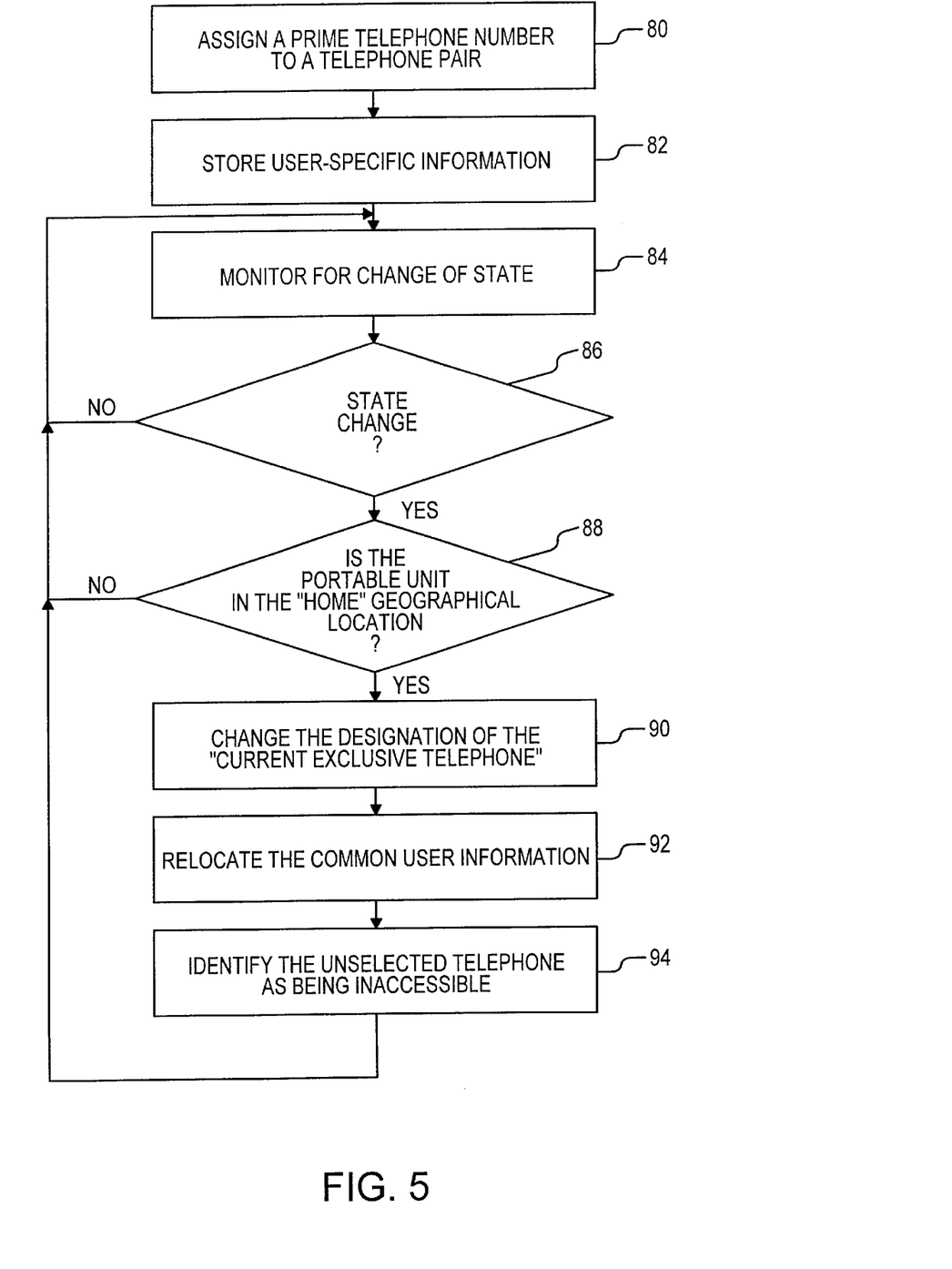
FIG. 5 is a process flow of steps for utilizing "feature forwarding" in accordance with the invention.

A process flow of steps for implementing "feature forwarding" will be described with reference to FIG. 5. In step 80, a single prime telephone number is assigned to the telephone pair. In the embodiment described above, the wired telephone 52 and the wireless telephone 56 are connected to the prime line 26 via the activator/deactivator 18. Initially, the wireless telephone 56 may be designated as the current exclusive telephone to which telephone service is to be extended.

In step 82, user-specific information is stored. This includes the common user information, such as the last number dialed by the current exclusive telephone. Step 84 represents the continuous monitoring to detect a change of state. This step may be implemented using any of the alternatives described above. Thus, in the first and second hardware configurations, the PBX 10 monitors signals from the digital line 32 that is connected to the wired telephone 52. When the wireless phone 56 is changed between a power recharging state and an operational state, notification signals will be sent along the digital line 32. On the other hand, in the third hardware configuration, the notification signals are transmitted from the wireless telephone 56 via the antenna systems 38 and 60.

When a change of state is detected at the decision step 86, the optional step of determining whether the portable unit is in the "home" geographical area is performed at step 88. This applies to only the third hardware configuration. The wireless telephone 56 transmits a notification signal via its radio channel. If the radio base station that receives the notification signal is the "home" location of the wireless phone, the change of state is acted upon by executing steps 90, 92 and 94. On the other hand, if the receiving radio base station is one that provides radio coverage to an area other than the one in which the wired telephone 52 resides, the process loops back to the monitoring step 84. Similarly, if no change of state is detected at the decision step 86, the process loops back to the monitoring step.

In step 90, there is a change in the designation of the "current exclusive telephone" to which the common user information is to be applied. In the above-described embodiment, the PBX controller 14 and the activator/deactivator 18 are utilized to perform steps 90, 92 and 94. At step 92, the common user information is "relocated." That is, the common user information is transferred from being applied to the previously designated current exclusive telephone to the presently designated current exclusive telephone. The relocation can be performed entirely within the resources of the PBX 10, such as by reconfiguring the associations of memory components 44, 46 and 48 in FIG. 2. Alternatively, the relocation may be a transfer of the common user information from one of the telephones 52 and 56 of the telephone pair to the presently designated current exclusive telephone.

At step 94, the telephone that is no longer designated as the current exclusive telephone is identified as being out-of-service or otherwise inaccessible. Thus, ring signals and other control signals are exchanged only with the designated current exclusive telephone. However, there are two exceptions. Firstly, for the first and second hardware configurations, the wired phone is monitored to detect when the wireless phone is placed in the power recharger state, even when the wired telephone is identified as being out-of-service. In the third hardware configuration, even when the wireless phone is out-of-service, it is continuously monitored to detect when the phone is removed from the power recharging state. Following the execution of steps 90, 92 and 94, the process loops back to the monitoring step 84 to detect the next change in state.

What is claimed is:

1. A method of selectively enabling user-specific features comprising steps of:

associating operation of a substantially fixed telephone unit with operation of a portable telephone unit, said fixed telephone unit and said portable telephone unit being independently operable with respect to conducting telephone sessions in which voice information is exchanged, including assigning a prime telephone number to accessing both of said fixed and portable telephone units, said fixed and portable telephone units being configured to execute user-specific features, including common user-specific features that are available via operations of both of said fixed and portable telephone units;

storing common user information relevant to implementation of said common user-specific features;

monitoring current availability of said portable telephone unit while neither of said fixed and portable telephone units is in an off-hook state, said current availability being specific to functionality of said portable telephone unit;

based upon said current availability of said portable telephone unit, selecting one of said fixed and portable telephone units as a current exclusive telephone unit to which said common user information is to be applied; and identifying said fixed and portable telephone unit that is not selected as said current exclusive telephone unit as being an out-of-service telephone unit, including deactivating functions/features of said out-of-service telephone unit, thereby consistently rendering one of said fixed and portable telephone units deactivated and inaccessible while neither of said fixed and portable telephone units is in an off-hook state.

2. The method of claim 1 wherein said step of storing common user information includes storing data indicative of a telephone number for an automatic redial feature.

3. The method of claim 1 wherein said step of storing common user information includes storing data for enabling access to voice mail messages of a specific user.

4. The method of claim 1 further comprising a step of reassigning a database of said common user information with each change in selection of said current exclusive telephone unit.

5. The method of claim 4 wherein said step of reassigning includes transmitting said database to said current exclusive telephone unit.

6. The method of claim 1 wherein said step of monitoring includes detecting when said portable telephone unit is in a power recharging state, said fixed telephone unit being selected as said exclusive telephone unit when said portable telephone unit is in said power recharging state, said portable telephone unit being selected as said exclusive telephone unit upon detection of removal from said power recharging state, wherein only said exclusive telephone unit receives a ring signal in response to an incoming call for said prime telephone number.

7. The method of claim 6 wherein said steps of monitoring and selecting include determining whether said portable telephone unit is in a geographical area assigned to a home radio base station of said portable telephone unit, said fixed telephone unit being within said geographical area, said step of selecting further including identifying said fixed telephone unit as said exclusive telephone unit only when said portable telephone unit is in said geographical area and in said power recharging state.

8. A method of providing telephone service for a user having a wired telephone and a wireless telephone, each of said wired and wireless telephones being feature telephones, said method comprising steps of:

establishing connectivity at a telecommunications switch such that only one of said wired and wireless telephones receives service at any one time, including configuring said connectivity such that ring signals are forwarded to said only one that is receiving service;

monitoring periods of time in which said wireless telephone is in a power recharging state; and automatically switching between extending service to said wired telephone and extending service to said wireless telephone on a basis of said monitoring, including automatically transferring dynamic user information for implementation of service features at said wired telephone when said wireless telephone is detected as having entered said power recharging state and including automatically transferring said dynamic user information for implementation of said service features at said wireless telephone when said wireless telephone is detected as having been removed from said power recharging state;

wherein said step of automatically transferring said dynamic user information includes transmitting a database from said telecommunications switch to one of said wired and wireless telephones each time that said automatic switching occurs, said database having said dynamic user information.

9. The method of claim 8 wherein said step that includes automatically transferring said dynamic user information includes carrying over user information related to at least one of a service feature relating to access to voice mail messages and a service feature relating to automatically redialing a telephone number.

10. The method of claim 9 wherein said step of monitoring includes exchanging notification signals between said telecommunications switch and at least one of said wired and wireless telephones each time that said wireless telephone enters and is removed from said power recharging state.

11. A telecommunications system comprising:

a wired telephone configured to provide a plurality of first user-specific service features;

a wireless telephone configured to provide a plurality of second user-specific service features, said first and second user-specific service features including mutually available service features that utilize dynamic user information during implementation, said wired and wireless telephones being independently operable with respect to conducting telephone sessions in which voice information is exchanged;

a power recharger for recharging said wireless telephone;

a telecommunications switch having a capability of detecting when said wireless telephone is coupled to said power recharger, said telecommunications switch being configured to enable said wired telephone when said wireless telephone is coupled to said power recharger and to enable said wireless telephone when said wireless telephone is removed from said power recharger, said telecommunications switch being further configured to disable an unselected one of said wired and wireless telephones with respect to receiving incoming calls when a selected one of said wired and wireless telephones is enabled, such that said wired and wireless telephones are prevented from being simultaneously enabled with respect to receiving said incoming calls, said telecommunications switch having memory for storing said dynamic user information and being configured to switch between exclusively associating said dynamic user information with said wired and wireless telephones in response to said detecting when said wireless telephone is coupled to said power recharger, such that said wired telephone is disassociated from said dynamic user information when said wireless telephone is removed from said power recharger; and an override operatively associated with said power recharger to enable a user to override responsiveness of said telecommunications switch with respect to said enabling said wireless telephone when said wireless telephone is removed from said power recharger.

12. The telecommunications system of claim 11 wherein said power recharger is connected to said wired telephone, said wired telephone being in communication with said telecommunications switch to transmit notification signals indicative of when said wireless telephone is coupled to said power recharger.

13. The telecommunications system of claim 12 wherein one of said power recharger and said wireless telephone is in communication with said telecommunications switch to transmit notification signals indicative of when said wireless telephone is coupled to said power recharger.

14. The telecommunications system of claim 11 wherein said wired and wireless telephones are assigned a common prime telephone number, said telecommunications switch being configured to identify said unselected one of said wired and wireless telephones as being out-of-service.

15. The telecommunications system of claim 11 wherein said mutually available service features relate to accessing voice mail messages and to redialing telephone numbers, said dynamic user information including data related to dialed telephone numbers and related to availability of a voice mail message.

16. The telecommunications system of claim 11 wherein said telecommunications switch is a private branch exchange (PBX), said memory including a database of said dynamic user information, said PBX being connected to support communication via a plurality of pairs of wireless and wired telephones.

17. The telecommunications system of claim 11 wherein said override includes a switch on said power recharger.

* * * * *